(12) United States Patent
Blaes et al.

(10) Patent No.: US 12,360,212 B2
(45) Date of Patent: Jul. 15, 2025

(54) RADAR-BASED GROUND PLANE CHARACTERISTIC DETERMINATION

(71) Applicant: Zoox, Inc., Foster City, CA (US)

(72) Inventors: Patrick Blaes, Redwood City, CA (US); Badeea Ferdaous Alferdaous Alazem, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 509 days.

(21) Appl. No.: 17/829,058

(22) Filed: May 31, 2022

(65) Prior Publication Data

US 2023/0384419 A1     Nov. 30, 2023

(51) Int. Cl.
  *G01S 7/41* (2006.01)
  *G01S 13/93* (2020.01)
  *G01S 13/931* (2020.01)
  *B60W 40/06* (2012.01)

(52) U.S. Cl.
  CPC ............ *G01S 7/412* (2013.01); *G01S 13/931* (2013.01); *B60W 40/06* (2013.01); *B60W 2420/408* (2024.01); *G01S 2013/93271* (2020.01)

(58) Field of Classification Search
  CPC ............... G01S 7/412; G01S 13/931; G01S 2013/93271; G01S 7/417; G01S 13/865; G01S 13/867; G01S 2013/9325; G01S 2013/9319; G01S 2013/93272; G01S 13/89; G01S 2013/9318; G01S 2013/93185; G01S 13/87; G01S 2013/932; B60W 40/06; B60W 2420/408
  See application file for complete search history.

(56) References Cited

U.S. PATENT DOCUMENTS

| | | | |
|---|---|---|---|
| 5,508,706 A | 4/1996 | Tsou et al. | |
| 9,857,316 B2* | 1/2018 | Pratt | G01N 22/04 |
| 10,935,650 B2* | 3/2021 | Campbell | G05D 1/0257 |
| 2018/0259634 A1* | 9/2018 | Okamoto | G01S 13/726 |
| 2020/0309899 A1 | 10/2020 | Jonas et al. | |
| 2021/0055399 A1 | 2/2021 | Hiramoto | |
| 2021/0199760 A1* | 7/2021 | Izadian | G01S 13/582 |
| 2022/0326343 A1* | 10/2022 | Li | G01S 7/021 |

(Continued)

FOREIGN PATENT DOCUMENTS

DE    102019213084 A1 *  3/2021   ...... B60W 2420/408

OTHER PUBLICATIONS

Office Action for U.S. Appl. No. 17/828,995, Dated Aug. 2, 2024, Blaes, "Radar-Based Ground Plane Determination" 32 pages.

(Continued)

*Primary Examiner* — Bernarr E Gregory
*Assistant Examiner* — Juliana Cross
(74) *Attorney, Agent, or Firm* — Lee & Hayes, P.C.

(57) ABSTRACT

Techniques for estimating a ground plane based on lidar data and/or attributes of the ground plane are discussed herein. A vehicle captures radar data, e.g., 4D radar data including height information, as it traverses an environment. The radar data can include direct returns from an object and reflected or multipath returns, e.g., that reflect off a ground surface and the object. A position of the ground plane can be estimated based at least in part on a distance between direct returns and the reflected returns. Attributes of the ground plane may be determined from differences between the direct returns and the reflected returns.

20 Claims, 7 Drawing Sheets

(56) References Cited

U.S. PATENT DOCUMENTS

| | | | |
|---|---|---|---|
| 2023/0008853 A1* | 1/2023 | Kondo | G01S 7/411 |
| 2023/0102248 A1* | 3/2023 | Kim | G01S 13/931 |
| | | | 342/26 D |
| 2023/0136860 A1 | 5/2023 | Wang et al. | |
| 2023/0144600 A1* | 5/2023 | Jokanovic | G01S 7/414 |
| | | | 342/70 |

OTHER PUBLICATIONS

Office Action for U.S. Appl. No. 17/828,995, dated Jan. 10, 2025, 41 pages.

\* cited by examiner

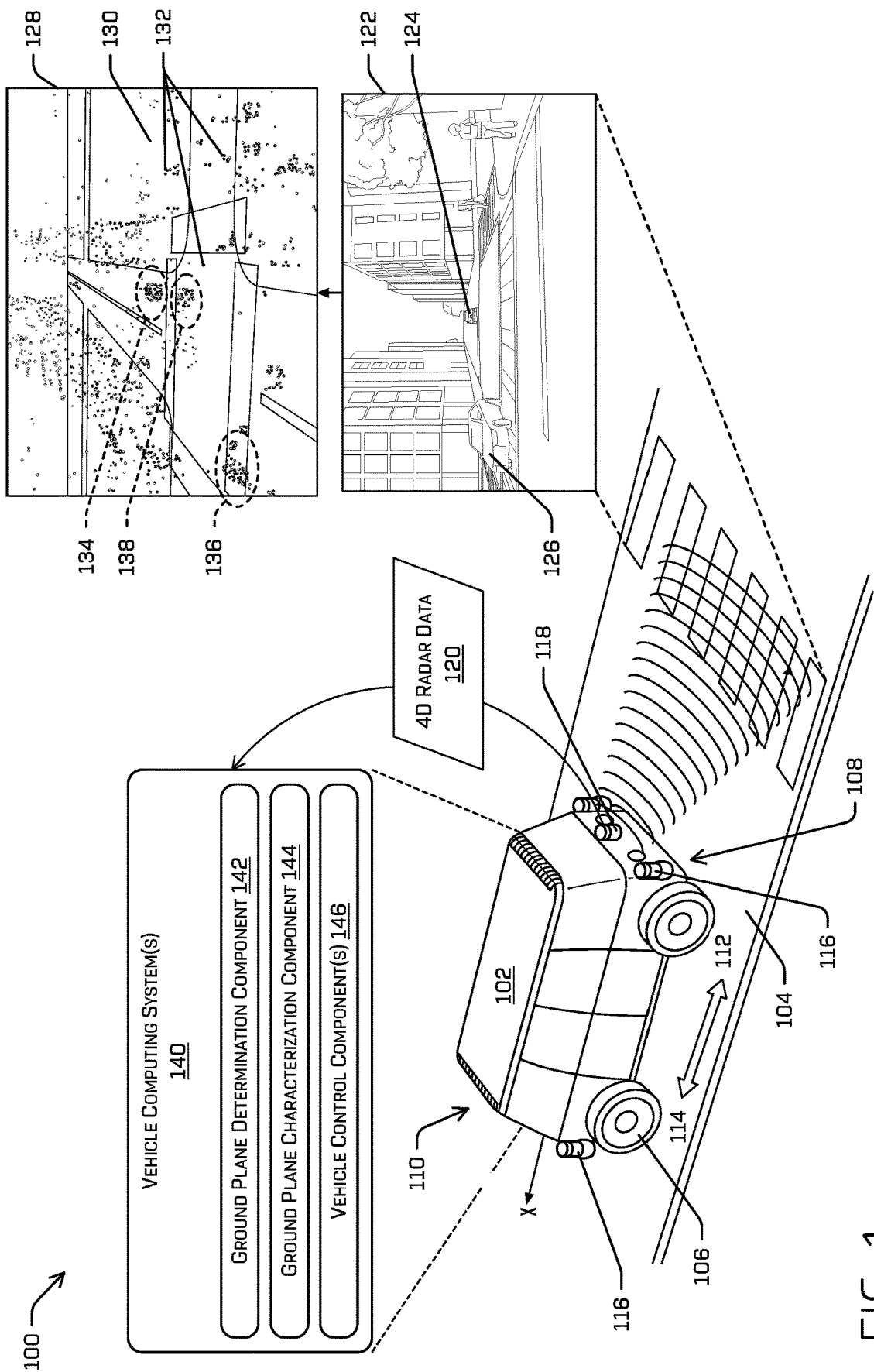

RADAR-BASED GROUND PLANE CHARACTERISTIC DETERMINATION

BACKGROUND

A vehicle can use information about its environment to perform various operation. For example, an autonomous vehicle can use information about objects in its environment to determine and implement a travel path relative to those objects. In some examples, information about the road surface on which the vehicle is travelling, including a position of the ground plane and/or characteristics of the ground plane, is of interest. For example, information about a position of a ground plane can be used to localize a vehicle, to determine and/or implement controls at the vehicle, and/or to improve mapping. Information about attributes of the ground plane may be useful to improve safety outcomes, such as on rough, wet, and/or icy roads.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 is a schematic representation illustrating example systems and techniques for using radar data to estimate a ground plane and/or attributes of the ground plane, as described herein.

DETAILED DESCRIPTION

Figure 2A:
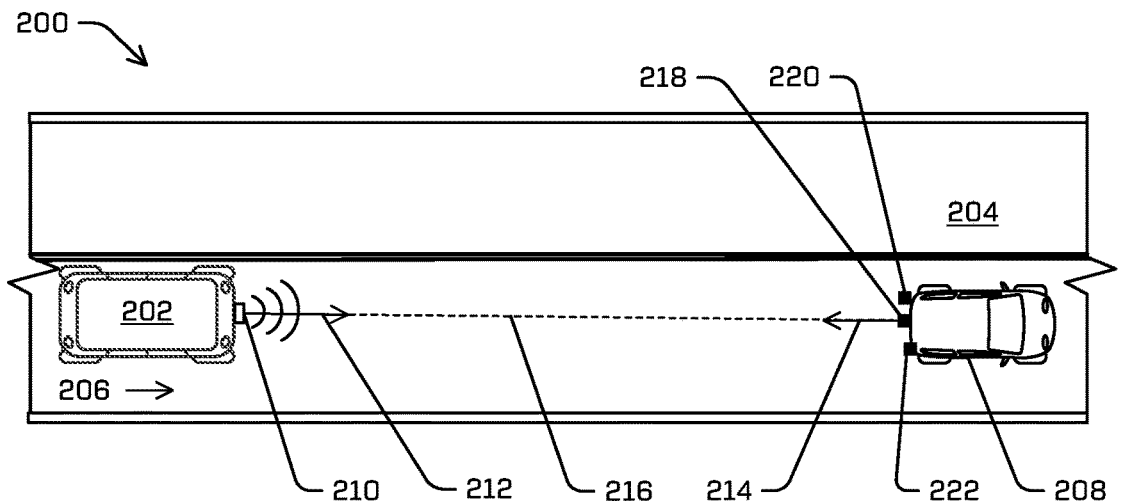
FIGS. 2A and 2B are schematic illustrations of concepts of ground plane determination using radar data, as described herein.

Systems and techniques for using radar data to estimate a ground plane in an environment and/or to determine characteristics of the ground plane are discussed herein. As used herein, a "ground plane" generally refers to an estimation of a ground surface in the environment. Although referred to as a "plane," the "ground plane" need not be planar. For instance and without limitation, a ground plane according to aspects of this disclosure can include topographical features, such as undulations, pitch changes, and/or the like. Moreover, a ground plane can correspond to one or more of a road surface, a parking surface, a surface of a sidewalk, and/or any other surface.

Aspects of this disclosure may use radar data from a four-dimensional (4D) radar sensor. Unlike other conventional radar sensors, 4D radar sensors may generate height data, e.g., a height of a return relative to some reference (horizontal) plane. The 4D radar data can also include more conventional radar data, such as range, azimuth, velocity, intensity, radar cross section, and/or the like. For instance, the 4D radar data may comprise a radar point cloud.

Aspects of this disclosure can include functionality to estimate a position, extents, and/or other characteristics of a ground plane from the radar data. For example, aspects of this disclosure may identify a first subset of the radar data associated with first returns that are direct returns from an object in the environment. Aspects of this disclosure may also identify a second subset of the radar data associated with reflected returns that are returns that have reflected off the object and the ground. After associating the direct returns and the reflected returns, the techniques described herein can determine a location of the ground plane vertically between the two subsets, e.g., based at least in part on the height data.

Aspects of this disclosure can also include functionality to identify direct returns versus multipath returns. In some examples, the radar data can be segmented and a representation can be determined for each of a plurality of discrete segments. For instance, the data may be partitioned by a grid, e.g., a two-dimensional grid, using height and azimuth information from the radar data. In some examples, a histogram or other graphical representation can be generated for each of the segments, e.g., based on range information, intensity information, velocity information, and/or other aspects of the radar data. In some examples, when the graphical representations of two vertically-aligned segments have similar characteristics, e.g., similar range distributions, similar intensities, or the like, one of the segments (e.g., the vertically higher segment) may be identified as direct returns from the object and the other of the segments (e.g., the vertically lower segment) may be identified as reflected returns corresponding to the object. Because the reflected returns result from the presence of the ground surface, a ground plane can be estimated between the segments according to aspects of this disclosure.

Aspects of this disclosure can also include functionality to determine attributes of the ground plane based on the radar data. For instance, differences in attributes of the radar data associated with the direct returns and attributes of the radar data associated with the reflected returns may provide information about the ground surface. Without limitation, the distance between the direct returns and the reflected returns may be directly proportional to an incline of the road surface. In addition, a difference in intensities, radar cross section (RCS) values, and/or signal-to-noise ratios may correspond directly to road surface composition, texture, and/or moisture content.

Based on the ground plane estimation and/or the attributes of the ground plane, aspects of this disclosure can include functionality to control the vehicle. In some instances, radar data may be more reliable than other sensor data types. For example, radar data may have a longer range and/or may function better in rainy, foggy, and/or other atmospheric conditions. Thus, the techniques described herein may provide improved functionality for understanding the environment of the vehicle.

In at least some examples of this disclosure, the radar data may be input into a machine learned (ML) model. The ML model can output data that can include ground plane estimation data (e.g., ground plane height at various ranges and/or azimuth angles) and/or surface attribute data. In some examples, a mesh can be determined based on the data output by the ML model, and the vehicle can be controlled based on the mesh.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using radar data. Further, although discussed in the context of radar data, the techniques discussed herein may be used with other types of depth data, such as data from time-of-flight sensors, RGB-D cameras, lidar data, and the like. Additionally, the techniques described herein can be used with real data (e.g., captured using sensor(s)), simulated data (e.g., generated by a simulator), or any combination of the two.

FIG. 1 is a perspective view showing aspects of the present disclosure. More specifically, FIG. 1 illustrates an example environment 100 that includes a perspective view of a vehicle 102 equipped with one or more radar sensors and computing components for, among other functionality, processing the radar data to estimate a ground plane and/or determine characteristics of the ground, in accordance with embodiments of the disclosure. In some embodiments, the environment 100 may include one or multiple features, components, and/or functionality detailed further herein with reference to FIGS. 2A-7.

In the illustration of FIG. 1, the vehicle 102 is configured to travel across a surface 104 (e.g., a road surface, a drivable surface, and/or a navigable surface, etc.), for example, to transport people and/or cargo from a first location to a second location. The vehicle 102 may be an autonomous vehicle configured to operate according to a Level 5 classification issued in 2013 by the U.S. National Highway Traffic Safety Administration, which describes a vehicle capable of performing all safety-critical functions for the entire trip, with the driver (or occupant) not being expected to control the vehicle at any time. In that case, since the vehicle may be configured to control all functions from start to stop, including all parking functions, the vehicle 102 may be unoccupied and/or may lack standard interfaces and control features, e.g., a steering wheel, accelerator and/or brake pedals, or the like. However, aspects of this disclosure are not limited to use in autonomous vehicles; the vehicle 102 may be any vehicle and/or robot. Without limitation, the vehicle 102 may be manually controlled by a driver at all times, may be capable of performing some actions autonomously and require manual control for other actions, and/or be otherwise configured and/or controlled.

The vehicle 102 of FIG. 1 is illustrated as an automobile having four wheels 106 on which the vehicle 102 traverses the surface 104 in the environment 100. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, or any combination thereof. In addition, although the example vehicle 102 has four wheels 106, the systems and methods described herein may be incorporated into vehicles having fewer or a greater number of wheels, tires, and/or tracks.

The example vehicle 102 may have four-wheel steering and may operate generally with equal performance characteristics in all directions. For instance, the vehicle 102 may be configured for selective bi-directional travel, in which a first end 108 of the vehicle 102 is the front end of the vehicle 102 and a second end 110 of the vehicle 102 is the rear end of the vehicle when traveling in a first direction 112, and such that the first end 108 is the rear end of the vehicle 102 and the second end 110 is the front end of the vehicle when traveling in an opposite, second direction 114. These example characteristics and capabilities may facilitate greater maneuverability, for example, in small spaces or crowded environments, such as parking spaces, parking lots, urban areas, or the like.

The vehicle 102 also includes, or has associated therewith, one or more sensors 116 (and/or sensor devices). For example, the sensor(s) 116 may include one or more radar sensors, one or more cameras, one or more LIDAR devices, one or more time-of-flight sensors, and/or other types of sensor modalities. In the example of FIG. 1, one or more of the sensor(s) 116 may be provided as sensor pods coupled to the vehicle 102. Although the sensor(s) 116 are illustrated as coupled to sides of the vehicle 102, some or all of the sensor(s) 116 may be roof-mounted and/or otherwise positioned on or with respect to the vehicle 102. The sensor(s) 116 are disposed to sense objects in the environment 100. In some examples, the sensor(s) 116 may have a field of view in the environment 100 and the aggregate of all fields of view may be substantially 360-degrees around the vehicle.

The vehicle 102 is illustrated as including a radar sensor 118, which may be one of the sensor(s) 116. The radar sensor 118 is illustrated as being fixed to the first end 108 of the vehicle 102. When the vehicle 102 is configured to travel with the first end 108 as a leading end, e.g., in the first direction 112, the radar sensor 118 generates radar data 120 in a field of view corresponding to a portion of the environment 100 in front of the vehicle 102, e.g., in the direction of travel. Although the radar sensor 118 is illustrated as being mounted on the side of the body of the vehicle, in other examples the radar sensor 118 may be mounted on the roof of the vehicle 102 or at some other location to generate data in front of the vehicle 102.

In examples of this disclosure, the radar sensor 118 is a four-dimensional (4D) radar sensor. For instance, the 4D radar sensor may use a large radio frequency channel array to detect attributes of surfaces (e.g., surfaces) associated with objects in the environment 100. Like conventional radars, 4D radar may generate radar data, e.g., as the radar data 120, that includes range (or distance) information, directional (e.g., an azimuth) information, radar cross-section (RCS) information, intensity information, velocity (e.g., Doppler velocity or absolute velocity) information, or the like. Unlike conventional radar sensors, however, the radar data (e.g., the radar data 120) generated by the 4D radar sensor may also include height information, e.g., as a distance relative to some base (e.g., horizontal) plane associated with the radar sensor 118. In some examples, the radar sensor 118 generates the radar data 120 as a point cloud or similar point-based dataset with individual points corresponding to a radar return having one or more associated attributes, including but not limited to a range, an RCS value, an intensity, a height, an azimuth, and/or other information.

FIG. 1 also provides a visual representation of an example of the radar data 120. Specifically, FIG. 1 includes a first visual representation 122 of a scene in the environment 100. The first visual representation 122 may correspond to an image (e.g., a 2D image) of a portion of the vehicle in front of the first end 108 of the vehicle 102 when the vehicle is travelling in the first direction 112. As illustrated, the scene includes a first additional vehicle 124, a second additional vehicle 126, buildings, pedestrians, and other objects and features. Of course, the scene, and elements therein, is for example only.

FIG. 1 also includes a second visual representation 128 showing the radar data 120 superimposed over a representation of a ground surface 130. More specifically, the radar data 120 is illustrated as a number of points 132 in a 3D space including the ground surface 130. The number of points 132 is provided for example only. In examples, the points 132 may be provided as a point cloud. As shown in the second visual representation 128, a first grouping 134 of the points 132 may be returns (e.g., direct returns) associated with the first additional vehicle 124 in the first visual representation 122, a second grouping 136 of the points 132 may be returns (e.g., direct returns) associated with the second additional vehicle 126, and additional groupings of points may correspond to the buildings, pedestrians, and/or other features in the environment 100. The second visual representation 128 also shows a third grouping 138 of the points 132 that are below (e.g., in a vertical direction) the first grouping 134 of the points 132. The third grouping 138 of the points 132 also correspond to the first additional vehicle 124, but they are associated with double-path or reflected returns, e.g., returns corresponding to radio signals that are emitted by the radar sensor 118, reflect off the first additional vehicle 124, and off the ground surface 130 before returning to the radar sensor 118. As detailed herein, aspects of this disclosure include using information about direct returns (e.g., the first grouping 134) and reflected returns (e.g., the third grouping 138).

As will be appreciated, although the third grouping 138 of the points 132 appears to be below the ground surface, the points 132 in the third grouping 138 are reflected off the object, e.g., the first additional vehicle 124, but also off the ground. Because they are received at the sensor after reflecting off the ground, the sensor interprets the height of the return as being a height below the ground surface, e.g., at a range corresponding to the distance travelled and along a distance associated with the return angle from the ground. Additional details of the direct returns and of the reflected returns are provided below, with reference to FIG. 2.

As illustrated in FIG. 1, the vehicle 102 also may include one or more vehicle computing system(s) 140. The vehicle computing system(s) 140 include one or more components that can receive the radar data 120 and cause the vehicle computing system(s) 140 and/or the vehicle 102 to perform various operations. As shown in FIG. 1, in aspects of this disclosure, the vehicle computing system 140 can include a ground plane determination component 142 and a ground plane characterization component 144.

The ground plane determination component 142 can include functionality to estimate a ground plane, e.g., a height, position, or the like, of the surface 104, the ground surface 130, and/or the like. More specifically, and as detailed further herein, the ground plane determination component 142 may be configured to identify points or returns within the radar data 120 that are associated with objects in the environment 100. Without limitation, the ground plane determination component 142 can identify the first grouping 134 of the points 132 as being associated with the first additional vehicle 124. In some instances, the first grouping 134 can be determined from a representation of points, such as a histogram of returns in some predetermined space in the environment, as detailed further below with reference to FIG. 3. For instance, the representation of points may be based on one or more attributes of the points or returns in the predetermined space, such as range, intensity, RCS value, or the like. In other examples, one or more clustering techniques (e.g., techniques that include and/or use machine learning, deep learning, 3D segmentation, etc.) may be used to determine the first grouping of points 134 as being associated with an object (e.g., the first additional vehicle 124) in the environment 100.

The ground plane determination component 142 can also be configured to identify points or returns within the radar data 120 that are associated with reflected returns (or multipath returns, ghost returns, phantom returns, or the like) associated with objects in the environment. Without limitation, the ground plane determination component 142 can identify the third grouping 138 of the points 132 as being reflected returns (reflected off the ground) associated with the first additional vehicle 124. In some instances the third grouping 138 can be determined from a representation of points, such as a histogram of returns in some predetermined space in the environment, as detailed further below with reference to FIG. 3. In other examples, one or more clustering techniques (e.g., techniques that include and/or use machine learning, deep learning, 3D segmentation, etc.) may be used to determine the third grouping 138 of points as being associated with multipath returns from an object (e.g., the first additional vehicle 124) in the environment 100.

The ground plane determination component 142 can also be configured to determine a ground plane based on the identified groupings of points associated with objects in the environment 100. Without limitation, the ground plane determination component 142 can include functionality to estimate a ground plane or surface (e.g., vertically) between the direct returns and the multipath returns. In the example of FIG. 1, a section of the ground surface 130 may be estimated at a height equidistance between a representative height of the first grouping 134 of the points 132 and a representative height of the third grouping 138 of the points 132, as described further herein. In still further examples, the ground plane determination component 142 can use one or more techniques, e.g., machine-learned models, deep learning, trained models, or the like, to determine aspects of the ground surface 130 based on the radar data 120.

Although for ease of illustration FIG. 1 shows only the third grouping 138 of the points 132, a portion of the ground plane may be estimated for each paired grouping of direct returns and multipath or reflected returns associated with the same object. As more objects are present at different positions in the environment, the ground plane determination component 142 can generate a better estimation of the ground plane throughout the environment 100.

The ground plane characterization component 144 can include functionality to determine attributes of the ground plane, such as the surface 104, the ground surface 130, or the like. In some examples, like the ground plane determination component 142, the ground plane characterization component 144 may include functionality to identify portions of the radar data 120 that are associated with direct returns from an object, e.g., the first grouping 134 of the points 132, and portions of the radar data 120 that are associated with multipath or reflected returns from the object, e.g., the third grouping 138 of the points 132.

The ground plane characterization component 144 can also include functionality to compare attributes of the first grouping 134 of the points 132 to the third grouping 138 of the points 132. In some instances, the ground plane characterization component 144 can compare locations, heights, intensities or signal strengths, RCS values, signal-to-noise ratios, and/or other attributes or distributions thereof of the first grouping 134 and the third grouping 138. Without limitation, the difference in height between the first grouping 134 and the third grouping 138 may directly correlate to a pitch or incline of the ground surface between the radar sensor 118 (e.g., at the vehicle 102) and the detected object (e.g., the first additional vehicle 124). In other examples, a difference in intensity between the direct returns and the multipath returns may correlate to physical attributes of the ground surface such as a roughness, wetness, iciness, or the like. Without limitation, a closer correspondence in intensity values may indicate that the ground surface is wet (or icy) whereas a greater difference in intensity values may indicate that the ground surface is dry. Additional aspects of the ground plane characterization component 144 are detailed further below, with reference to FIG. 4.

The vehicle computing system(s) 140 can also include one or more vehicle control components 146. Without limitation, the vehicle control component(s) 146 can be configured to control aspects of the vehicle 102 based at least in part on the estimation of the ground plane as determined by the ground plane determination component 142 and/or the attributes of the ground plane as determined by the ground plane characterization component 144. Without limitation, the vehicle control component(s) 146 can use the ground plane estimation to localize the vehicle, e.g., relative to maps or other predetermined representations of the environment 100. In other examples, the vehicle control component(s) 146 can use the attributes of the ground plane to inform vehicle controls such as steering, propulsion, braking, or the like. In one non-limiting example, if the ground surface is known to be icy, the vehicle 102 may be controlled with greater caution, e.g., by increasing a minimum following distance between the vehicle 102 and the first additional vehicle 124 or other leading vehicles, by increasing an anticipated stopping distance for the vehicle 102, or the like. Such actions by the vehicle control component(s) 140 can increase passenger safety outcomes. In other examples, if the surface 104 is known to include an incline over the next several meters, propulsion may be increased to maintain a constant speed. Such actions by the vehicle control component(s) 140 can increase passenger comfort and/or reduce excessive acceleration and/or braking, for instance.

Figure 2B:
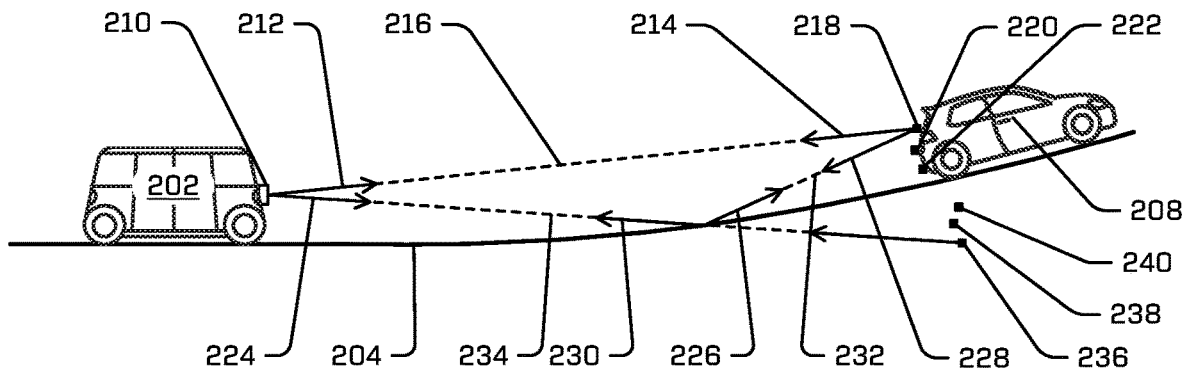

FIGS. 2A and 2B are top and side plan views, respectively, that show aspects of this disclosure. More specifically, FIGS. 2A and 2B show an environment 200 in which a vehicle 202, which may be the vehicle 102, is travelling on a surface 204, which may be the surface 104, generally in a direction 206. An additional vehicle 20, which may the first additional vehicle 124 in FIG. 1, also is travelling on the surface 204, in front of the vehicle 202. A radar sensor 210, which may be the radar sensor 118 is associated with the vehicle 202. For instance, the radar sensor 210 may be secured to the vehicle 202. The radar sensor 210 may be a 4D radar sensor, configured to generate data about objects, surfaces, or the like, as detailed further herein. In some example systems, the radar sensor 210 may include a Doppler sensor, a pulse-type sensor, a continuous wave frequency modulation (CFWM) sensor, or the like. The radar sensor 210 may emit pulses of radio energy at predetermined intervals. In some implementations, the intervals may be configurable, e.g., to promote enhanced detection of objects at relatively far distances or relatively close distances. Generally, the pulses of radio energy emitted by the radar sensor 210 reflect off objects in the environment 200, such as the additional vehicle 208 and can be received by the radar sensor 210, e.g., as radar data or radar returns.

In the example of FIGS. 2A and 2B, radio energy emitted by the radar sensor 210 generally along the direction of arrow 212 may contact the additional vehicle 208 and be reflected back toward the radar sensor 210, e.g., generally along the direction of arrow 214. In this example, the radio energy is emitted and returns generally along the same path, which may be an object return path 216. The object return path 216 is a substantially straight line in the illustrated example. The radio energy reflected along the object return path 216 is captured by the radar sensor 210, e.g., as data corresponding to an object return 218 shown schematically in FIG. 2A.

The object return 218 is illustrated as a block at a position determined based on the captured data. For example, information associated with the object return 218 may include information indicative of a location in the environment, e.g., a location of the additional vehicle 208. In the example of FIG. 2A, the location information may include a range and azimuth relative to the vehicle 202 (or the radar sensor 210) or a position in a local or global coordinate system. Also in implementations, the object return 218 may include signal strength information. For example, the signal strength information can indicate a type of the object. More specifically, radio waves may be reflected more strongly by objects having certain shapes and/or compositions. For example, broad, flat surfaces and/or sharp edges are more highly reflective than rounded surfaces, and metal is more highly reflective than a person. In some instances, the signal strength may include a radar cross-section (RCS) measurement. The object return 218 may also include velocity information. For instance, a velocity of the additional vehicle 208 may be based on a frequency of radio energy reflected by the additional vehicle 208 and/or a time at which the reflected radio energy is detected.

FIG. 2B also shows the vehicle 202, the surface 204, the additional vehicle 208, the return path 216, and the object return 218. As noted above, the radar sensor 210 may be a 4D radar sensor that is further configured to generate height information about radar returns, including the object return 218. As shown, the return path 216 is angled, relative to a horizontal plane or other plane associated with the radar sensor 210. Thus, as illustrated in FIGS. 2A and 2B, the object return 218 has an associated range, azimuth, and height. The object return also can include additional information including, but not limited to, velocity information, RCS or other signal strength information, signal-to-noise ratio information, or the like. The radar data can also include specific information about the sensor, including but not limited to an orientation of the sensor, e.g., a pose of the sensor relative to the vehicle, a pulse repetition frequency (PRF) or a pulse repetition interval (PRI) for the sensor, a field of view or detecting arc(s), or the like. In some implementations, certain aspects of the radar data 168 may be pre-configured, e.g., the field of view, the orientation, the PRF or PRI, or the like, in which case that data may be available, e.g., in storage, and may not be transferred with radar returns, for example. The sensor data 170 can include any information about the environment 100 and/or the additional sensor(s) 166.

FIGS. 2A and 2B also show additional object returns 220, 222, which also correspond to detected radio energy that has reflected off the first additional vehicle 208. In the example of FIGS. 2A and 2B, the object returns 218, 220, 222 are direct returns, e.g., based on radio energy that has reflected only off of the additional vehicle 208 before being detected at the radar sensor 210. The object returns 218, 220, 222 may be examples of accurate data captured by the radar sensor 210, e.g., they may accurately depict aspects of the additional vehicle 208. However, the radar sensor 210 can also generate returns that are not direct returns. For example, FIG. 2B also illustrates that radio energy emitted by the radar sensor 210 generally along the direction of arrow 224 may reflect off the ground surface 204, to proceed generally along the direction of arrow 226. In the illustrated example, the radio energy reflected off the surface 204 may then be reflected by the additional vehicle 208 back toward the surface 204, generally along the direction of arrow 228, i.e., opposite the direction of the arrow 226. Finally, the radio energy may then reflect again off the surface 204, and return to the radar sensor 210, generally along the direction of arrow 230. Accordingly, radio energy reflected off the additional vehicle 208 may return to the radar sensor 210 along a reflection return path that includes a first leg 232 between the additional vehicle 208 and the ground surface 204 and a second leg 234 between the point of impact with the ground and the vehicle 202 (e.g., the radar sensor 210). Such reflected energy may be captured by the radar sensor 210 as a reflected return 236. As illustrated in FIG. 2B, the reflected return 236 is received along the direction of the second leg 234, e.g., along the arrows 224, 230, but has a range equal to the distance of the reflected return path, e.g., the distance that is the sum of the distance of the first leg 232 and the distance of the second leg 234. As will be appreciated from FIG. 2B, the first reflected return 238 suggests the presence of an object at the location corresponding to the reflected return 236, i.e., along the direction of the second leg 234. However, such "object" is a non-existent, phantom "object," because the reflected return 236 is a multipath return, having reflected off both the additional vehicle 208 and the ground surface 204.

FIG. 2B illustrates that the radar sensor 210 can also capture additional reflected returns 238, 240. Like the reflected return 236, the additional reflected returns 238, 240 correspond to multipath returns that have reflected off both the ground surface 204 and the additional vehicle 208. Conceptually, these reflected returns 236, 238, 240 are inaccurate returns, inasmuch as they do not accurately represent an object in the environment. However, aspects of this disclosure may identify the reflected returns 236, 238, 240 and determine information about the ground surface 204, as detailed further herein.

Figure 3:
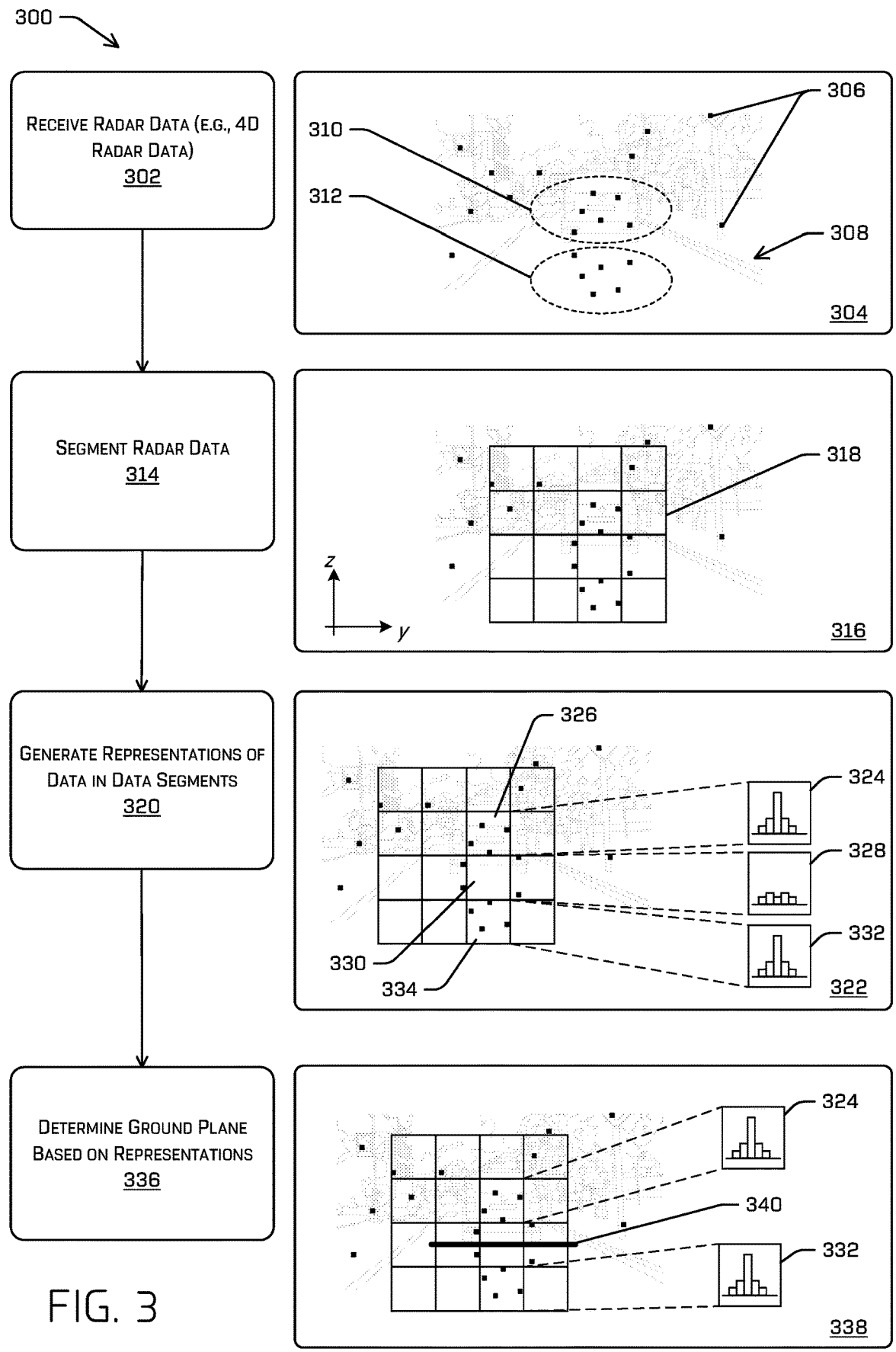
FIG. 3 includes textual and visual flowcharts to illustrate an example method for determining a ground plane using radar data, as described herein.

FIG. 3 is a pictorial flow diagram 300 of an example process of estimating a ground plane based on radar data. An operation 302 includes include receiving radar data. For example, the radar data received at the operation 302 may be the radar data 120 discussed above and/or generated by the radar sensor 118 and/or the radar sensor 210. The radar data received at the operation 302 may be generated by a 4D radar sensor and/or other radar data that includes height information, in addition to range, azimuth, velocity, and/or other conventional information generated by radar sensors. Although discussed in the context of radar data, the operation 302 can include receiving any three-dimensional data or data comprising height and depth components.

In some instances, the operation 302 can include receiving a plurality of radar datasets from a plurality of radar sensors associated with a vehicle. In some instances, the operation 302 can include combining or fusing data from two or more radar sensors (and/or from a single radar sensor over a period of time) into a single radar dataset. In some instances, the operation 302 can include extracting a portion of the radar data for processing, such as over a period of time.

An example 304 accompanying the operation 302 includes a representation of the radar data. Specifically, the example 104 shows a number of radar returns 306 superimposed over a representation 308 of a sensed environment. For ease of illustration, a relatively few number of radar returns are shown, although in implementations the radar returns 306 may number in the hundreds, thousands, tens of thousands, or more. Without limitation, the radar returns 306 may be part of a radar point cloud, with each of the radar returns 306 being associated with one or more surfaces in the environment.

The representation 308 represents a scene of an environment, which may be an urban environment, including a road surface, a vehicle on the road surface, a sidewalk, street signs, pedestrians, building, and the like. The radar returns 306 may be generated based on radio energy reflected off of one or more of these and/or other objects, as detailed herein. For illustration and discussion, a first grouping 310 of the radar returns 306 and a second grouping 312 of the radar returns are identified in the example 304. The first grouping 310 and the second grouping 312 may correspond to the first grouping 134 and the third grouping 138 of the points 132 in FIG. 1. For instance, in the example of FIG. 3, the first grouping 310 may include direct returns associated with a vehicle (like the returns 218, 220, 222) and the second grouping 312 may include multipath or reflected returns associated with the vehicle (like the reflected returns 236, 238, 240).

An operation 314, includes segmenting the radar data. For example, the operation 314 can include considering subsets of the radar data (e.g., individually) to determine whether the subsets include returns that are likely to be direct returns from an object or multipath returns from the object.

In an example 316 accompanying the operation 314, like in the example 304, the radar returns are shown in a y-z plane. The position of the radar returns 306 in the y-dimension may be based at least in part on azimuth information determined by the radar sensor, and the position of the radar returns 306 in the z-dimension may be based at least in part on height information determined by the radar sensor. As will also be appreciated, each of the radar returns 306 also include range or depth information, generally corresponding to a distance in an x-dimension, normal to the y- and z-dimensions (e.g., normal to the plane of the example 316.

As a part of the operation 314, the radar returns 306 are segmented or grouped into a number of areas or subsets for further processing. As shown in the example 316, the radar returns are partitioned by a grid 318, with all points in one segment or cell of the grid 318 forming a subset of the radar data. In some examples, the grid 318 may have predetermined segment or cell sizes. For instance, each cell may correspond to a one-meter by one-meter section of the field of view of the radar sensor(s). This is for example only; other sizes, shapes, and or cell arrangements also are contemplated. Partitioning of the data using other than the grid 318 also is contemplated. For example, and without limitation, the data may be partitioned based on any of the attributes of the radar data described herein.

In some alternative examples, the operation 314 can include mapping individual points of the point cloud to a voxel or other three-dimensional space in the environment. The operation 314 can also include associating other radar data, as detailed herein, with the voxel space. Also in examples, a label or other data can be applied to the voxels. In some examples, the voxel space can include tens, hundreds, or more voxels in each of three dimensions (e.g., x, y, z), although any number of voxels can be included in the voxel space. In some instances, the voxel space can correspond to a physical environment, such as an area around an origin or a virtual origin of the lidar dataset. For example, the voxel space can represent an area 100 meters wide, 100 meters long, and 100 meters high.

Further, each voxel in the voxel space can represent a physical area, such as 50 centimeters in each dimension. As can be understood in the context of this disclosure, the voxel space can represent any area of the environment, and individual voxels can represent any volume as well. In some instances, voxels can be a uniform size throughout the voxel space, while in some instances, a volume of a voxel can vary based on a location of the voxel relative to an origin of the data. For example, as the density of lidar data can decrease as a distance from a lidar sensor increases, the size of the voxel in the voxel space can increase in proportion to a distance from the voxel to a radar sensor (or an origin representing a plurality of radar sensors).

In some instances, the grid 318 in the example 316 may correspond to multi-channel image data (e.g., a two-dimensional input grid) based on the voxel space. Each region or portion of the multi-channel image data can be determined as a region of a two-dimensional representation associated with a column (or other dimension) of the voxel space. In some examples, each region of the multi-channel image data can be a cell of the two-dimensional representation associated with the column of the voxel space. Each region of the two-dimensional input grid can be associated with a 50 centimeter×50 centimeter region and can include feature data. Each region can be associated with (e.g., positioned adjacent to) one or more adjacent (e.g., neighbor) regions.

An operation 320 includes generating representations of the data in the data segments. For example, once the data is partitioned, each of the subsets may considered individually, e.g., to determine whether the segment is likely associated with a specific object, like the vehicle in the examples described here. The operation 320 may include generating a representation of each segment of data, e.g., as a signature or identifier of the radar returns 306 contained within that segment.

An example 322 accompanying the operation 320 illustrates graphical representations of segments of the radar data. Specifically, the example 322 shows a first histogram 324 associated with a first segment 326 of the data, a second histogram 328 associated with a second segment 330 of the data, and a third histogram 332 associated with a third segment 334 of the data. In some examples, the histograms 324, 328, 332 are graphical representations showing a cumulative number of radar returns at a depth (or depth range). For instance, one bar in the histograms 324, 328, 332 may represent a number of points from a zero to one-meter depth, a second bar may represent a number of points from a depth of one-meter to two-meters, and so forth. Of course, increments other than one-meter, e.g., larger or smaller increments, may be used.

As illustrated, both the first histogram 324 and the third histogram 332 include a relatively large concentration of points at a single depth, relative to other depths. In contrast, the second histogram 328 has fewer points and/or a greater distribution between the points. As will be appreciated from the scene representation 308, the first histogram 324 may include a large concentration of direct returns from the vehicle. The third histogram 332 also may have a large concentration of reflected or multipath returns associated with the vehicle (and the ground surface on which the vehicle is travelling).

The example 322 is described as using histograms, because histograms may provide a good representation of a likely object. Specifically, if a segment under consideration includes a large concentration of returns at a certain range, there is a high probability that an object is located at that range within the segment. In some instances, the radar data may be processed prior to, or while, generating the histograms. For instance, and without limitation, returns may be filtered based on one or more criteria prior to being included in the histogram. Similarly, smoothing or other functions may be used, e.g., to form a line plot corresponding to the histogram. Other modifications to the histograms also are contemplated. For example, and without limitation, the histograms 324, 328, 332, may be based on data other than or in addition to depth information. As detailed herein, radar sensors can generate other information, including but not limited to intensity information, RCS values, signal-to-noise ratios, velocity information, or the like. In some examples the histograms can include accumulations of points having one or more of these values. Additionally, or alternatively, a composite score for each point, e.g., that takes into account one or more of depth and/or other information, can be determined, and the composite score can be used to group points. The operation 320 generally can include some analysis of the segments generated at the operation 314, to determine whether an object is likely in the segment and, if an object is likely, a depth of the object.

In the illustrated example, the first and third histograms 324, 332 are illustrated as being substantially the same, e.g., because they have a similar depth distribution. In other examples, other and/or additional data may be used to determine an association of segments. For example, intensity values may have a correlation based on range of the object detected. In some examples, direct and reflected returns associated with an object that are closer to the sensor may have a higher correlation than for objects farther away. Similarly, as the height between the direct returns and the reflected returns increases, e.g., because the object is above or otherwise uphill relative to the sensor, correlations of data between the direct returns and the reflected returns may be relatively lower. In some examples, returns that follow a longer path from emitter to receiver may result in a lower intensity than an equivalent return following a shorter path (e.g., due to diffusion/dissipation). Thus, multipath returns that reflect from points farther from a road surface may have a lower intensity than a return that is reflected from a point closer to a road surface. The disclosed histograms and other techniques for determining symmetry from direct returns and multipath returns may take this property into account to better determine a location of a ground plane, ground plane attributes, and/or to identify candidate multipath returns.

In some examples, a previous ground plane determination location can be used to aid in determining a current ground plane determination using the disclosed techniques. Smoothing techniques can be used to account for instantaneous inaccuracies in ground plane determination to fit current determinations with prior determinations, for example. In some examples, localized differences in ground planes can be determined used the disclosed techniques (e.g., detection of sink holes or large pot holes). As disclosed herein, the techniques can be applied to estimate a ground plane location across an entire scene or in a localized are by applying the techniques to certain objects within a scene. In some examples, ground plane location determinations can be inferred across a larger area depending on, for example, the sparsity of available objects with multipath returns, a type of road surface, a location of the road surface, prior road surface location determinations, etc.

Moreover, the disclosure is not limited to the use of histograms. Other representations of the radar data in the segments also are contemplated. Without limitation, the histograms 324, 328, 332 may be replaced with a single digit or score for each segment. For instance, the operation 320 can include determining a single depth for each of the segments, which may be an average depth of all points, a mode of the points, or the like. The operation 320 may also determine a likelihood of an object within the segment based on the depth information and/or the other radar information. In one non-limiting example, each segment can be labelled in the operation 320 as a likelihood of identifying an object and a quantification of that likelihood, e.g., 85%, 90%, or the like.

Moreover, although the example 322 illustrates using spatial segmentation of the radar data to identify objects, other techniques can be used to identify objects. For example, and without limitation, the objects can be determined using classification or semantic information, e.g., semantic segmentation information. In some examples, perception and/or prediction systems can identify objects, such as vehicles, pedestrians, bicyclists, or the like. Such systems may include trained models or algorithms that are configured to receive sensor data, including the radar data and/or other types of sensor data, and generate representations of objects in the sensor data. In some examples, such systems can also generate one or more labels and/or classifications for the bounding box, including an object type. In some examples, data from such systems can be used to identify objects in the environment, and direct returns can be identified from the radar data as returns associated with the known object. In continuing with the operation 320, the histograms or other representations of the radar data can be generated for the known object(s).

An operation 336 includes determining a ground plane based on the representations. For example, using the representations of the segments generated at the operation 320, the operation 336 may compare vertically aligned sections of the grid 318 to determine likely direct returns and corresponding reflected returns. The operation 336 then includes estimating a position (e.g., height) of the ground plane between those vertically-aligned corresponding direct and reflected returns.

An example 338 accompanies the operation 336. As illustrated, the first histogram 324 and the third histogram 332 are associated with vertically-aligned segments of the grid 318. Moreover, and as noted above, the first histogram 324 and the third histogram 332 indicate that the radar data in each of the segments of the grid 318 those histograms represent has a similar "signature." For instance, both the first histogram 324 and the third histogram 332 have a relatively large concentration of points at a single depth. Moreover, the first histogram 324 and the third histogram 332 indicate that the depth at which the points are located is within a threshold depth. In this example, the operation 336 can include determining that the radar returns associated the first segment 326 of the data correspond to direct returns and the radar returns associated with the third segment 334 of the data correspond to reflected or multipath returns, as described herein.

The example 338 also includes a depiction of a ground plane estimation 340. The ground plane estimation 340 may be a horizontal line between, e.g., in a vertical dimension, the first segment 326 of the grid 318 and the third segment 334 of the grid 318. More specifically, because the first segment 326 of the grid corresponds to direct returns from an object and the third segment 334 of the grid 318 corresponds to multipath returns, the ground surface causing the multipath returns must be disposed between those vertically-aligned segments 326, 334. In examples, the ground plane 340 may be estimated as being equidistant between the first segment 326 and the third segment 334, although in other embodiments the ground plane may be biased in one direction or the other. Moreover, although the ground plane estimation 340 is illustrated as a line, the ground plane estimation 340 may be a range of heights.

As will be appreciated, the ground plane estimation 340 may correspond to the estimated height of the ground at a single range. Specifically, the ground plane estimation 340 may be an estimate of the height of the ground at a range corresponding to a range of the radar points in the first segment 326 and/or a range corresponding to a range of the radar points in the third segment 334. (As noted above, the range of points in those segments 326, 334 is likely to be similar when the points are associated with direct returns and multipath or reflected returns.) Similarly, the ground plane estimation 340 may correspond to the estimated height of the ground plane in only a relatively small width or azimuth angle in the field of view of the radar sensor. Accordingly, aspects of this disclosure can include determining a plurality of pairs of segments having direct returns and reflected returns and generating a number of ground plane estimations for each pair.

In some implementations, the operation 336 can include determining a representation of the ground surface from a plurality of ground plane estimations, e.g., at different depths and locations in the environment. In some examples, any of various models, algorithms, and/or machine learned algorithms can be utilized to create a mesh based on the various ground plane estimations. A mesh may be formed by determining polygons (e.g., triangles) including at least three points that create a surface. As will be appreciated, by using objects in the environment to estimate discrete ground planes in the environment, the discrete ground planes can be aggregated to form an overall representation of the ground surface, including topographical variations and ground features. Without limitation, using aspects of this disclosure may allow for differentiation between the road surface and a sidewalk or other non-road surface. Moreover, by identifying height of the ground surface, variations in the road surface, e.g., from speed bumps, potholes, or the like may also be detected in some examples.

The example of FIG. 3 illustrates concepts of this disclosure using radar returns generated at a certain time, e.g., according to a stationary scene. In some instances, the operations shown in FIG. 3 can be performed at discrete moments in time, e.g., for a single readout of the radar sensor. In other examples, radar data can be aggregated, e.g., over multiple radar generation cycles, with a ground plane determination being done based on the aggregated data. For example, the operation 320 and/or the operation 336 can be performed on aggregated radar data, e.g., aggregated over time. By aggregating data over time, the ground plane estimation may be a smoother estimation, e.g., less prone to anomalous conditions that may occur during a single readout of the radar sensor.

In some instances, the ground plane estimation 340 and/or mesh information associated therewith can represent an estimated height of a ground surface of an environment proximate to a vehicle. The mesh and/or the ground segmentation information can be used to remove a ground surface from a point cloud and/or to perform segmentation on captured data. For example, data within a particular height or distance from the mesh can be determined to be associated with a ground surface. Such data can be removed or omitted, leaving data points that are not associated with ground surface. The remaining points can be clustered based on K-means clustering, nearest neighbors, adjacency thresholds, and the like. Objects can be determined based on such clustering, and objects can be tracked over time to determine velocity, pose, etc. associated with such objects.

Aspects of this disclosure can include controlling a vehicle based on the ground plane estimation 340. In some examples, the vehicle can be controlled to have a trajectory within a region associated with the ground plane estimation 340, based on the ground plane estimation 340 being determined to be associated with the ground surface. By determining that ground plane estimation 340 is associated with the ground surface and is not associated with an object (e.g., non-ground point), the vehicle can be controlled to navigate toward and through the region.

In some examples, the vehicle can be controlled to reduce a likelihood of collision with another object. The vehicle can be controlled to avoid (e.g., take a detour around) the object or to stop, based on ground plane estimation 340. Alternatively, the vehicle can be controlled to slow down to allow a position of the other object to change to a new position, based on the other object being a vehicle. The vehicle can then determine that a trajectory of the vehicle does not include the new position of the other object. The vehicle can then be controlled based on the trajectory.

Therefore, and as described herein, radar data can be captured and represented in a two-dimensional (or three-dimensional) space associated with an environment around a vehicle. By identifying associations between direct returns and multipath returns, a ground plane can be estimated. Multi-channel image data can be determined based on the three-dimensional voxel space. The multi-channel image data can include two-dimensional representation(s) of the three-dimensional voxel data. The multi-channel image data can be input into an ML model that outputs multi-channel output image data including a height and/or a classification of each region in the multi-channel output image data. A mesh and/or ground segmentation information can be determined based on the output from the ML model that includes an accurate and complete representation of the ground surface. The mesh and/or the ground segmentation information can be associated with a ground surface with greater accuracy than in conventional technologies.

Furthermore, by utilizing the ground plane estimation information to control the vehicle, expansion into new geographical regions is simpler. By determining the ground plane estimation information using the techniques described herein, unrealistic ground surface predictions can be avoided, while implicitly smoothing results of the ground surface predictions. The vehicle that is controlled utilizing the ground plane estimation information is also safer and more reliable. The vehicle, which can be controlled autonomously without human input, is able to accurately determine the ground surface and determine a planned route or trajectory in real time, with higher levels of efficiency and accuracy. As will also be appreciated, because aspects of this disclosure use radar data, and radar data is more reliable in certain atmospheric conditions and/or at greater distances, the ability to estimate the ground plane can be more reliable and/or reliable at greater distances from a current location, thereby further improving ground plane estimation.

Figure 4:
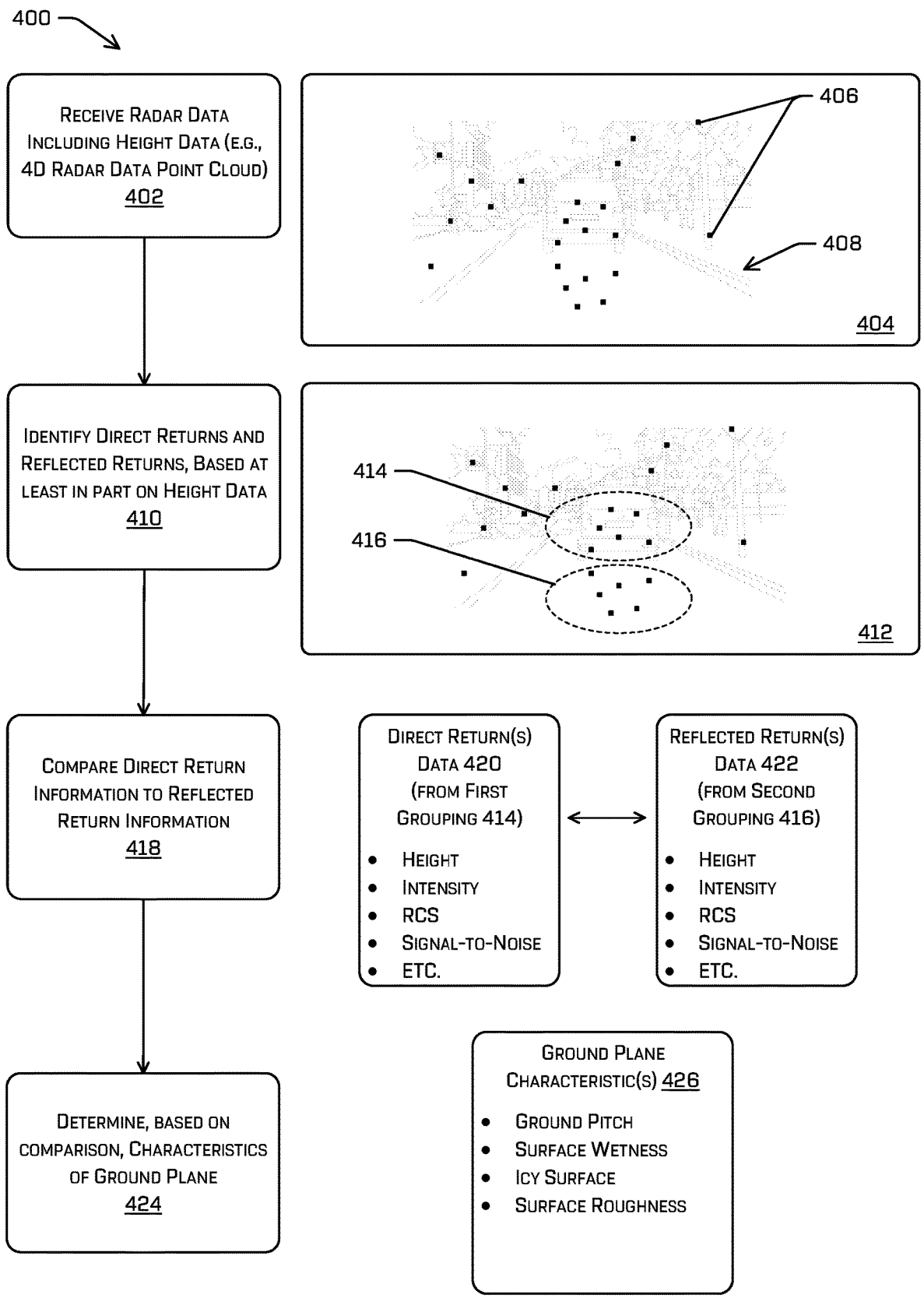
FIG. 4 includes textual and visual flowcharts to illustrate an example method for determining attributes of a ground plane using radar data, as described herein.

In addition to estimating physical attributes of a ground plane, e.g., a height and/or location of the ground plane at discrete locations in the environment, aspects of this disclosure also relate to determining attributes of the ground plane. FIG. 4 shows a graphical flow chart illustrating an example process 400 for determining attributes or characteristics of the ground plane.

At an operation 402, the process 400 includes receiving radar data including height data. The operation 402 may be substantially identical to the operation 302 discussed above. For example, the radar data received at the operation 402 may be the radar data 120 discussed above and/or generated by the radar sensor 118 and/or the radar sensor 210. The radar data received at the operation 402 may be generated by a 4D radar sensor and/or other radar data that includes height information, in addition to range, azimuth, velocity, and/or other information generated by radar sensors. Although discussed in the context of radar data, the operation 302 can include receiving any three-dimensional data or data comprising height and depth components.

In some instances, the operation 402 can include receiving a plurality of radar datasets from a plurality of radar sensors associated with a vehicle. In some instances, the operation 402 can include combining or fusing data from two or more radar sensors (and/or from a single radar sensor over a period of time) into a single radar dataset. In some instances, the operation 302 can include extracting a portion of the radar data for processing, such as over a period of time.

An example 404 accompanying the operation 402 includes a representation of the radar data. Specifically, the example 104 shows a number of radar returns 406 superimposed over a representation 408 of a sensed environment. For ease of illustration, a relatively few number of radar returns are shown, although in implementations the radar returns 406 may number in the hundreds, thousands, tens of thousands, or more. Without limitation, the radar returns 406 may be part of a radar point cloud, with each of the radar returns 406 being associated with one or more surfaces in the environment.

The representation 408 represents a scene of an environment, which may be an urban environment, including a road surface, a vehicle on the road surface, a sidewalk, street signs, pedestrians, building, and the like. The radar returns 406 may be generated based on radio energy reflected off of one or more of these and/or other objects, as detailed herein.

At an operation 410, the process 400 includes identifying direct returns and reflected, e.g., multipath, returns, based at least in part on height data. An example 412 accompanying the operation 412 illustrates a first grouping 414 of the radar returns 406 and a second grouping 416 of the radar returns 406. The first grouping 414 and the second grouping 416 may correspond to the first grouping 134 and the third grouping 138 of the radar returns 132 in FIG. 1, respectively. For instance, in the example of FIG. 4, the first grouping 414 may include direct returns associated with a vehicle (like the returns 218, 220, 222 discussed above) and the second grouping 416 may include multipath or reflected returns associated with the vehicle (like the reflected returns 246, 248, 240 discussed above).

In some examples, the operation 410 can include implementing some or all of the techniques discussed above in connection with the operations 314, 320, although the operation 410 is not limited to such techniques. In at least some examples, the operation 410 may be implemented using a machine learned model, e.g., trained on training data identifying direct returns and reflected returns. Any technique that identifies or otherwise differentiates between direct returns and reflected or multipath returns from an (same) object may be used.

At an operation 418, the process 400 includes comparing direct return information to reflected return information. For example, once the direct returns and the (corresponding) reflected returns are identified, the operation 418 can compare attributes of the direct returns to attributes of the reflected returns to glean information about the ground surface.

Accompanying the operation 418 are schematic representations of direct return(s) data 420 and the reflected return(s) data 422. The direct return(s) data 420 may be data for one or more of the returns 406 in the first grouping 414 (e.g., the direct returns), and the reflected return(s) data 422 may be data from one or more of the returns 406 in the second grouping 416. The data 420 and/or the data 422 can include any data associated with the radar returns 406, including but not limited to height data, intensity data, RCS data, and/or other data.

At an operation 424, the process 400 includes determining, based on the comparison, characteristics of the ground plane. For example, because the direct returns and the reflected returns are both from the same object, e.g., the vehicle in the example 404, physical characteristics of the returns would be expected to have similar characteristics. However, because the reflected returns have reflected off the ground surface (in addition to the object), attributes of the returns will have variations, and aspects of this disclosure use those variations to characterize the ground plane. A schematic representation of ground plane characteristics 426 that may be determined using techniques of this disclosure accompanies the operation 424.

In one non-limiting example, aspects of this disclosure can determine a pitch of the ground. For example, aspects of this disclosure can identify a distance, e.g., a vertical distance, between the direct returns and the reflected returns and determine a pitch of the ground, e.g., at the ground plane and/or between the vehicle and detected object, based on this distance. In some examples, the pitch may be directly related to the vertical distance of the direct returns and the reflected returns. For instance, direct returns and reflected returns for detected objects that are further above the radar sensor (e.g., further above a horizontal plane associated with the radar sensor) will be farther apart, whereas when the detected object is not above the vehicle, the direct returns and the directed returns will be relatively closer. Relatedly, in some examples, reflected returns may not be received at the radar sensor for objects that are below the radar sensor, e.g., when the ground plane is declined relative to the radar sensor.

In some examples, a single height may be associated with a grouping of the direct radar returns, e.g., the first grouping 414. The single height may be a center of mass for the grouping 414, a height associated with one or more sections of a grid, like the grid 318, and/or some other single point. Alternatively, heights of multiple points may be associated with the grouping, including but not limited to measured heights of some or all of the returns in the grouping. Similarly, a grouping of the reflected returns, e.g., the second grouping 416, may be represented by a single height or multiple heights. When multiple heights (or points) are used, averaging and/or other techniques can be used to determine the distance between the groupings, and therefore determine the pitch of the ground plane.

In another non-limiting example, the direct return(s) data 420 and the reflected return(s) data 422 can be used to determine a surface characteristics including surface wetness, the presence of ice one a surface, surface roughness, and/or other attributes. For example, the inventors have discovered that when the ground surface is wet or icy, the water/ice better reflects radio waves than when the surface is dry. Thus, for example, the operation 424 can include determining that a surface is wet or icy when a difference between (i) one or more first intensity values and/or first RCS values associated with the direct returns and (ii) one or more second intensity values and/or second RCS values associated with the reflected returns is less than a threshold difference. Conversely, the operation 424 can include determining that the surface is dry when the difference is greater than a threshold difference. Conceptually, because the drier surface will absorb more radio energy than the wet/icy surface, the measured intensity/RCS values will be appreciably lower than those associated with direct returns when the reflection is off a drier surface and will be closer to those associated with the direct returns when the surface is wet and/or icy.

In some examples, whether the ground surface is wet or icy may also be discernable from the differences in intensity and/or RCS. Without limitation, an icy surface may be more reflective than a wet surface. Accordingly, while both an icy surface and a wet surface may be more reflective than a drier surface (and thus result in reflected returns having more similar intensity/RCS values to direct returns when the surface is icy/wet), the icy surface may be even more reflective than the wet surface. Accordingly, in at least some examples, a difference between the intensities/RCS values of the direct returns and the reflected returns can be compared to a first threshold to determine that the surface is dry or wet/icy. The difference may also be compared to a second threshold to determine that the surface is wet or icy. In other examples, additional data about the environment, e.g., weather data such as an ambient temperature, a road temperature, or the like, may be used to determine whether a wet surface is likely to be icy or not.

In still further examples, the operation 424 can determine a surface roughness of the ground surface. Similar to the wet/dry surface determination, a relatively rougher surface may be less reflective than a relatively smoother surface. Accordingly, when difference(s) between the intensities/RCS values of the direct returns and the reflected returns are relatively greater, the surface may be relatively rougher, whereas when the difference(s) are relatively smaller, the surface may be relatively smoother. Similarly, the difference(s) may be correlated to different surface types. For instance, and without limitation, different types of ground surfaces, e.g., asphalt, smooth concrete, dirt, loose gravel, oil and stone, blacktop, or the like, may have an expected (e.g., predetermined) effect on intensity/RCS and/or other radar data values associated with reflected/multipath returns, relative to radar data values for direct returns. Such values may be stored in look-up tables or memory, for instance, associated with the vehicle and/or vehicle planning systems. Aspects of this disclosure may also be used to determine other attributes associated with the ground surface. Without limitation, any attribute that affects the reflectivity of radio waves at or near the ground surface can be quantified and determined using the techniques described herein.

Values and/or thresholds associated with characteristics of the ground surface can also vary based on depth and/or height of the object. For instance, the expected differences in intensity, RCS, and/or signal strength information may have a correlation based on range of the object detected. For example, attributes of direct and reflected returns associated with an object that is closer to the sensor may have a higher correlation than for objects farther away, regardless of the same ground surface type and/or condition(s). Aspects of this disclosure can account for such range-based differences using different thresholds and/or different expected values or ranges. Similarly, as the height between the direct returns and the reflected returns increases, e.g., because the object is above or otherwise uphill relative to the sensor, correlations of data between the direct returns and the reflected returns may be relatively lower. Aspects of this disclosure can account for such height-based differences using different threshold and/or different expected values or ranges.

As will be appreciated, determining characteristics of the ground surface using data can result in better control of a vehicle. For instance, if a ground surface is expected to include a large incline, the vehicle can be controlled to preemptively accelerate, e.g., to maintain a velocity as the vehicle encounters the incline. Moreover, if the road surface is confirmed to have potential hazards, e.g., loose gravel, standing water or ice, or the like, maneuvering of the vehicle can be altered to improve safety outcomes. Moreover, in some instances, the techniques described herein may be capable of better identifying road conditions like black ice.

Figure 5:
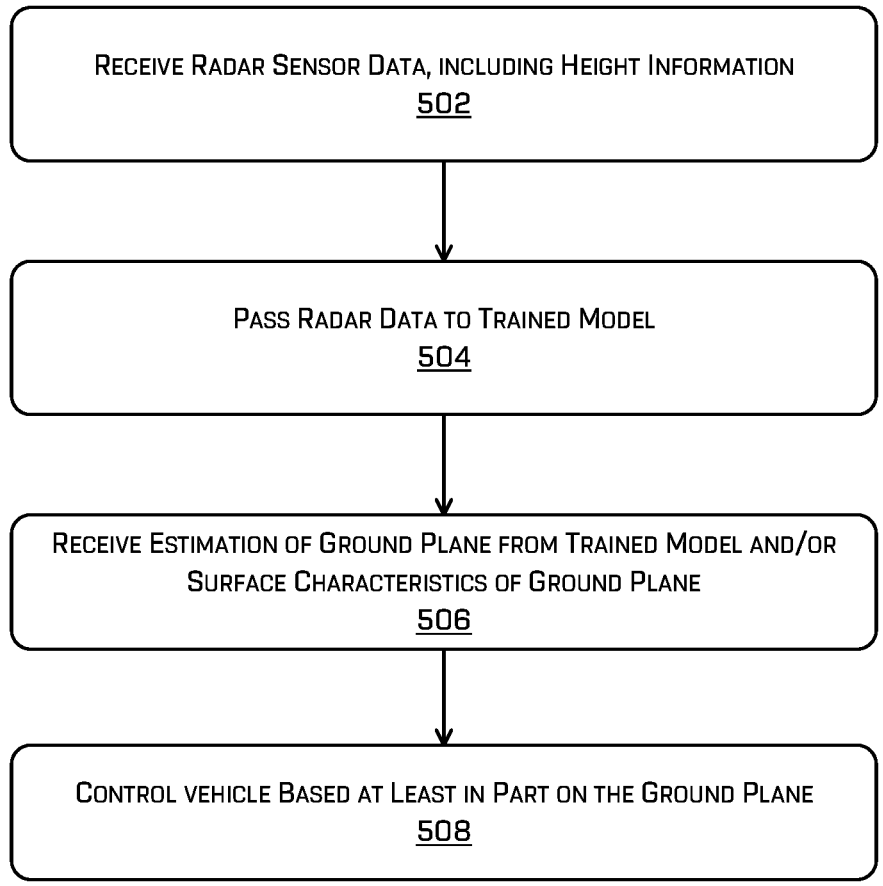
FIG. 5 is a flowchart of an example process for estimating a ground plane and/or attributes of the ground plane, according to aspects of this disclosure.

FIG. 5 is an example process for estimating a ground height and controlling a vehicle based at least in part on the ground height. For example, some or all of the process 500 can be performed by one or more components in FIG. 1 and/or FIG. 7, as described herein. For example, some or all of the process 500 can be performed by a perception component 722 discussed further below.

At operation 502, the process can include receiving radar data including height information. In some examples, the operation 502 can include receiving radar data of an environment captured by a radar sensor of an autonomous vehicle. The radar data can be associated with various objects and surface in the environment, such as cars, trucks, roads, buildings, bikes, pedestrians, etc. The radar data can be accumulated over time, and may be any of the types of the radar data discussed herein, including 4D radar data having height information.

At operation 504, the process 500 can include inputting the radar data to a machine learned (ML) model. In some examples, the operation 514 can include analyzing, by the ML model, the radar data, including the height data and other data, as discussed herein. Without limitation, the ML model can be trained to identify radar returns associated with an object and corresponding multipath or reflected returns. For instance, although FIG. 3 illustrates an example process using graphical representations of segments of radar data to determine corresponding direct returns and reflected returns, the operation 504 contemplates performing some or all of that functionality using the ML model.

At operation 506, the process can include receiving, from the ML model, an estimation of the ground plane and/or surface characteristics of the ground plane. As noted, the ML model can be trained to infer ground plane height and/or ground plan characteristics from radar data as detailed herein. In some examples, the ML model can output a mesh describing the ground surface, an identification of different surface types and/or attributes, or the like. Also in examples, the ML model can output one or more confidence values associated with ground plane estimation, the surface characteristic determination(s), and/or the like.

At operation 518, the process can include controlling a vehicle based at least in part on the ground plane. In some examples, the operation 518 can include controlling the autonomous vehicle based at least in part on the ground plane information and/or attributes of the ground plane. The autonomous vehicle can be controlled to proceed along a planned route or trajectory based on clustering or segmenting object data based on the ground plane. The autonomous vehicle can also be controlled to make driving decisions based on attributes of the ground surface, e.g., based on a likelihood that a road is wet or icy, that the road has a severe incline, or the like.

Figure 6:
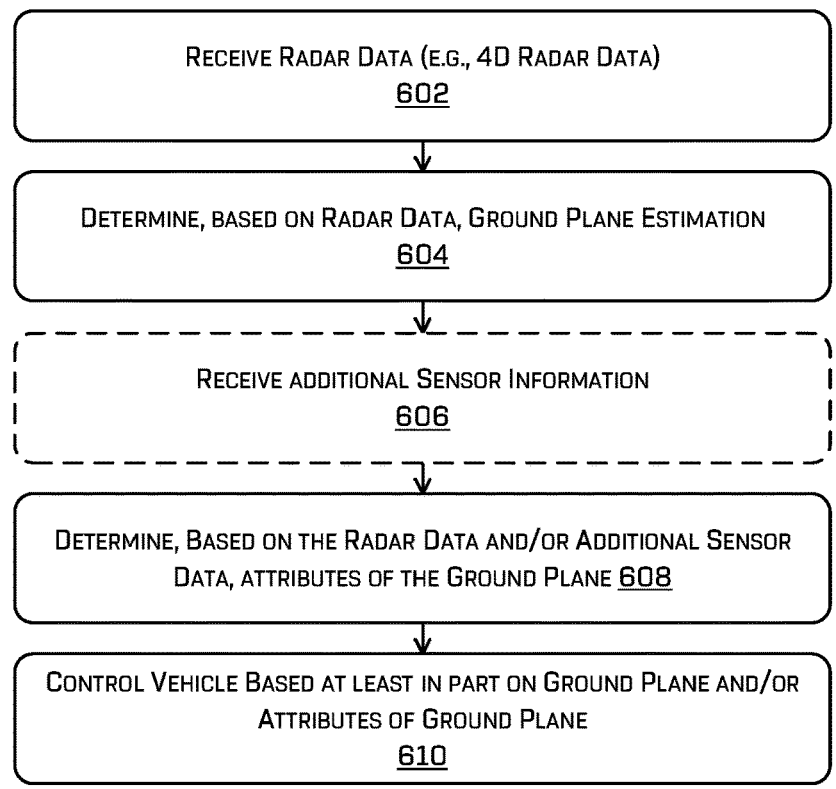
FIG. 6 is a flowchart of another example process for estimating a ground plane and/or attributes of the ground plane, according to aspects of this disclosure.

FIG. 6 is an example process for estimating a ground height and controlling a vehicle based at least in part on the ground height. For example, some or all of the process 600 can be performed by one or more components in FIG. 7, as described herein. For example, some or all of the process 600 can be performed by the perception component 722, discussed below.

At operation 602, the process can include receiving radar data. In some examples, the operation 602 can include receiving radar data of an environment captured by a radar sensor of an autonomous vehicle. The radar data can be associated with various objects in the environment, such as cars, trucks, roads, buildings, bikes, pedestrians, etc. The radar data can be any of the radar data described herein.

At operation 604, the process can include determining, based on the radar data, a ground plane estimation. In some examples, the operation 604 can include performing the process discussed above in connection with FIG. 3. In further examples, the operation 604 can utilize an ML model to determine the ground plane estimation, as discussed in connection with FIG. 5. In at least some examples, the ground plane estimation can be a mesh, e.g., a 3D mesh, that describes a ground surface in an environment of an autonomous vehicle.

At operation 606, the process 600 can optionally include receiving additional sensor information. In examples, the additional sensor data can include information from the radar sensor, e.g., data corresponding to the direct return(s) data 420 and/or the reflected return(s) data 422 detailed above. In other examples, the additional sensor data can include data from different types of sensor modalities, e.g., lidar data, image data, temperature data, and/or the like.

At operation 608, the process 600 can include determining, based on the radar data and/or the additional sensor data, attributes of the ground plane. For example, the operation 608 can include implementing some or all of the process 400 detailed above. Moreover, additional sensor data can be used to verify certain aspects. Without limitation, temperature data can indicate that an ambient air temperature is below freezing. In some examples, when the techniques described here are used to determine that the road surface is wet or icy, the temperature data may suggest that the road surface is icy, rather than just wet. The additional data may also be used to verify ground plane estimations and/or characteristics of the ground plane. For instance, lidar and/or image data may be used to identify an object in the environment, such as another vehicle or a pedestrian. The location of the object in the environment may be used to confirm, reject, or otherwise inform an estimation associated with the ground plane.

At operation 610, the process can include controlling the autonomous vehicle. In some examples, the operation 610 can include controlling the autonomous vehicle based at least in part on a representation of the ground plane and/or attributes of the ground plane. For example, the operation 610 may correspond to the operation 510 detailed above.

Figure 7:
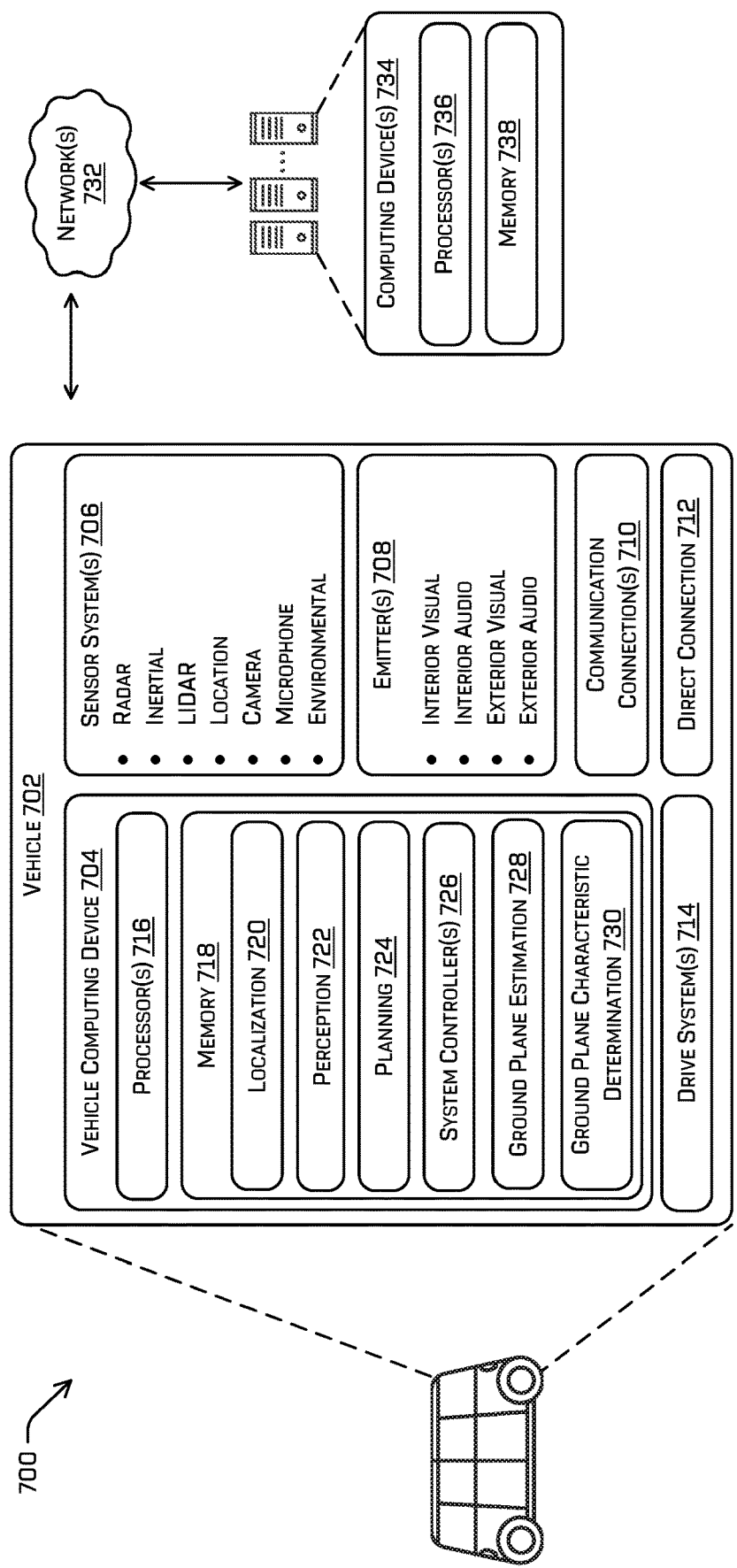
FIG. 7 is a block diagram of an example system for implementing the techniques described herein.

FIG. 7 is a block diagram of an example system for implementing the techniques described herein. In at least one example, the system 700 can include a vehicle 702. In the illustrated example system 700, the vehicle 702 is an autonomous vehicle; however, the vehicle 702 can be any other type of vehicle.

The vehicle 702 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 702 can be configured to control all functions from start to completion of the trip, including all parking functions, it may not include a driver and/or controls for driving the vehicle 702, such as a steering wheel, an acceleration pedal, and/or a brake pedal. This is merely an example, and the systems and methods described herein can be incorporated into any ground-borne, airborne, or water-borne vehicle, including those ranging from vehicles that need to be manually controlled by a driver at all times, to those that are partially or fully autonomously controlled.

The vehicle 702 can include one or more computing device(s) 704, one or more sensor system(s) 706, one or more emitter(s) 708, one or more communication connection(s) 710 (also referred to as communication devices and/or modems), at least one direct connection 712 (e.g., for physically coupling with the vehicle 702 to exchange data and/or to provide power), and one or more drive system(s) 714.

The one or more sensor system(s) 706 can be configured to capture sensor data associated with an environment. In implementations of this disclosure, the sensor system(s) 706 can include one or more radar sensors, and in particular may include one or more 4D radar sensors. The one or more sensor system(s) 706 can also, or alternatively, include time-of-flight sensors, location sensors (e.g., GPS, compass, etc.), inertial sensors (e.g., inertial measurement units (IMUs), accelerometers, magnetometers, gyroscopes, etc.), lidar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 706 can include multiple instances of each of these or other types of sensors. For instance, the time-of-flight sensors can include individual time-of-flight sensors located at the corners, front, back, sides, and/or top of the vehicle 702. As another example, the camera sensors can include multiple cameras disposed at various locations about the exterior and/or interior of the vehicle 702. The one or more sensor system(s) 706 can provide input to the computing device 704.

The vehicle 702 can also include one or more emitter(s) 708 for emitting light and/or sound. The one or more emitter(s) 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which can comprise acoustic beam steering technology.

The vehicle 702 can also include one or more communication connection(s) 710 that enable communication between the vehicle 702 and one or more other local or remote computing device(s) (e.g., a remote teleoperation computing device) or remote services. For instance, the one or more communication connection(s) 710 can facilitate communication with other local computing device(s) on the vehicle 702 and/or the one or more drive system(s) 714. Also, the one or more communication connection(s) 710 can allow the vehicle 702 to communicate with other nearby computing device(s) (e.g., other nearby vehicles, traffic signals, etc.).

The one or more communications connection(s) 710 can include physical and/or logical interfaces for connecting the computing device 704 to another computing device or one or more external networks 742 (e.g., the Internet). For example, the one or more communications connection(s) 710 can enable Wi-Fi-based communication such as via frequencies defined by the IEEE 802.11 standards, short range wireless frequencies such as Bluetooth, cellular communication (e.g., 2G, 3G, 7G, 7G LTE, 5G, etc.), satellite communication, dedicated short-range communications (DSRC), or any suitable wired or wireless communications protocol that enables the respective computing device to interface with the other computing device(s).

In at least one example, the vehicle 702 can include one or more drive system(s) 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor system(s) 706 to detect conditions of the drive system(s) 714 and/or the surroundings of the vehicle 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) 706 on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) 706 and to control operation of the various vehicle systems. In some examples, the drive system controller can include one or more processor(s) and memory communicatively coupled with the one or more processor(s). The memory can store one or more components to perform various functionalities of the drive system(s) 714. Furthermore, the drive system(s) 714 also include one or more communication connection(s) that enable communication by the respective drive system with one or more other local or remote computing device(s).

The computing device 704 can include one or more processor(s) 716 and memory 718 communicatively coupled with the one or more processor(s) 716. In the illustrated example, the memory 718 of the computing device 704 stores a localization component 720, a perception component 722, a planning component 724, one or more system controller(s) 726, a ground plane estimation component 728, and a ground plane characteristic determination component 730. Though depicted as residing in the memory 718 for illustrative purposes, it is contemplated that one or more of components in the memory 718 can additionally, or alternatively, be accessible to the computing device 704 (e.g., stored in a different component of vehicle 702) and/or be accessible to the vehicle 702 (e.g., stored remotely). Moreover, although the components are shown as separate modules or components for illustration and clarity, in examples the components may be otherwise configured. For example, aspects of the ground plane estimation component 728 and/or of the ground plane characteristic determination component 730 may be integrated into the perception component 722 and/or the planning component 724.

In memory 718 of the computing device 704, the localization component 720 can include functionality to receive data from the sensor system(s) 706 to determine a position of the vehicle 702. For example, the localization component 720 can include and/or request/receive a three-dimensional map of an environment and can continuously determine a location of the autonomous vehicle within the map. In some instances, the localization component 720 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 720 can provide data to various components of the vehicle 702 to determine an initial position of an autonomous vehicle for generating a trajectory, as discussed herein.

The perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, building, tree, road surface, curb, sidewalk, unknown, etc.). In additional and/or alternative examples, the perception component 722 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 722 can use perception algorithms to determine a perception-based bounding box associated with an object in the environment based on sensor data. For example, the perception component 722 can receive image data and classify the image data to determine that an object is represented in the image data. Then, using detection algorithms, the perception component 722 can generate a two-dimensional bounding box and/or a perception-based three-dimensional bounding box associated with the object. The perception component 722 can further generate a three-dimensional bounding box associated with the object. As discussed above, the three-dimensional bounding box can provide additional information such as a location, orientation, pose, and/or size (e.g., length, width, height, etc.) associated with the object.

The perception component 722 can include functionality to store perception data generated by the perception component 722. In some instances, the perception component 722 can determine a track corresponding to an object that has been classified as an object type. For purposes of illustration only, the perception component 722, using sensor system(s) 706 can capture one or more images of an environment. The sensor system(s) 706 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 706, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The planning component 724 can determine a path for the vehicle 702 to follow to traverse through an environment. For example, the planning component 724 can determine various routes and paths and various levels of detail. In some instances, the planning component 724 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 724 can generate an instruction for guiding the autonomous vehicle along at least a portion of the route from the first location to the second location. In at least one example, the planning component 724 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level can be selected to operate the vehicle.

In other examples, the planning component 724 can alternatively, or additionally, use data from the perception component 722 and/or a prediction component to determine a path for the vehicle 702 to follow to traverse through an environment. For example, the planning component 724 can receive data from the perception component 722 and/or the prediction component regarding objects associated with an environment. Using this data, the planning component 724 can determine a route to travel from a first location (e.g., a current location) to a second location (e.g., a target location) to avoid objects in an environment. In at least some examples, such a planning component 724 can determine there is no such collision free path and, in turn, provide a path which brings vehicle 702 to a safe stop avoiding all collisions and/or otherwise mitigating damage.

In at least one example, the computing device 704 can include the one or more system controller(s) 726, which can be configured to control steering, propulsion, braking, safety, emitters, communication, and other systems of the vehicle 702. These system controller(s) 726 can communicate with and/or control corresponding systems of the drive system(s) 714 and/or other components of the vehicle 702, which can be configured to operate in accordance with a path provided from the planning component 724.

The vehicle 702 can also connect to computing device(s) 734 via a network 732. The computing device(s) 734 can include one or more processor(s) 736 and memory 738 communicatively coupled with the one or more processor(s) 736. In at least one instance, the one or more processor(s) 736 can be similar to the processor(s) 716 and the memory 738 can be similar to the memory 718. In examples, the memory 738 can store one or more components to perform any of the functionality described herein.

The processor(s) 716 of the computing device 704 and the processor(s) 736 of the computing device(s) 734 can be any suitable processor capable of executing instructions to process data and perform operations as described herein. By way of example and not limitation, the processor(s) 716 and 736 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 718 computing device 704 and the memory 738 of the computing device(s) 734 are examples of non-transitory computer-readable media. The memory 718 and 738 can store an operating system and one or more software applications, instructions, programs, and/or data to implement the methods described herein and the functions attributed to the various systems. In various implementations, the memory 718 and 738 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 718 and 738 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

EXAMPLE CLAUSES

A. A: An example vehicle includes: a radar sensor disposed on the vehicle; one or more processors; and one or more non-transitory media storing instructions that, when executed by the one or more processors, perform operations comprising: receiving, from the radar sensor, radar data containing a plurality of radar returns corresponding to an environment of the vehicle, individuals of the plurality of radar returns including height information, intensity information, and signal strength information; determining a first subset of the plurality of radar returns comprising one or more direct returns from an object in the environment; determining, based at least in part on the height information, a second subset of the plurality of radar returns comprising reflected returns reflected off the object and a road surface; determining a difference between at least one of the intensity information or the signal strength information associated with the first subset and a corresponding at least one of the intensity information or the signal strength information associated with the second subset; determining, based at least in part on the difference, an attribute of the road surface; and controlling the vehicle based at least in part on the attribute of the road surface.

B: The vehicle of example A, wherein the attribute of the road surface is a road condition comprising at least one of a dry road, a wet road, or an icy road.

C: The vehicle of example A or example B, wherein: the determining the difference comprises determining a difference between a first intensity associated with the first subset of the plurality of radar returns and a second intensity associated with the second subset of the plurality of radar returns; and the determining the attribute of the road surface comprises determining an icy road condition in response to the difference being below a threshold difference.

D: The vehicle of any one of example A through example C, wherein: the signal strength information includes signal to noise ratio information; the determining the difference comprises determining a difference between a first signal to noise ratio associated with the first subset of the plurality of radar returns and a second signal to noise ratio associated with the second subset of the plurality of radar returns; and the determining the attribute of the road surface comprises determining an icy road condition in response to the difference being below a threshold difference.

E: The vehicle of any one of example A through example D, wherein the determining the difference comprises: determining a first average intensity or a first average signal strength associated with the first subset of the plurality of returns; determining a second average intensity or a second average signal strength associated with the second subset of the plurality of returns; and determining the difference as a difference between the first average intensity and the second average intensity or as a difference between the first average signal strength or the second average signal.

F: An example method includes: receiving radar data comprising a plurality of radar returns, individuals of the radar returns including height information and additional return information; determining, based at least in part on the height information, a first subset of the plurality of returns comprising one or more direct returns from an object and a second subset of the plurality of returns comprising reflected returns, reflecting off the object and a road surface; and determining, based at least in part on a difference between the first subset of the plurality of returns and the second subset of the plurality of returns, an attribute of the road surface.

G: The method of example F, wherein: the difference comprises a vertical distance between the first subset of the plurality of returns and the second subset of the plurality of returns; and the attribute of the road surface is a pitch associated with the road surface.

H: The method of example F or example G, wherein the pitch of the road surface is directly related to the vertical distance.

I: The method of any one of example F through example H, wherein the vertical distance is a vertical distance between a first representative point of the first subset of the returns and a second representative point of the second subset of the returns.

J: The method of any one of example F through example I, wherein: the difference comprises a difference between a first intensity associated with the first subset of the plurality of returns and a second intensity associated with the second subset of the plurality of returns.

K: The method of any one of example F through example J, wherein the attribute of the road surface is a road condition comprising at least one of a dry road, a wet road, or an icy road.

L: The method of any one of example F through example K, wherein the determining the attributes of the road surface comprises determining a wet road or an icy road condition in response to the difference being equal to or below a threshold difference or determining the dry road condition in response to the difference being above the threshold difference.

M: The method of any one of example F through example L, further comprising receiving additional information about the environment, wherein the determining the attribute of the road surface is based at least in part on the additional information about the environment.

N: The method of any one of example F through example M, wherein the determining the attribute of the road surface comprises comparing the difference to one or more expected differences, the expected differences being associated with one or more road surface types.

O: The method of any one of example F through example N, wherein: the difference is a difference between at least one of intensity information, signal strength information, or signal-noise ratio information associated with the first subset and a corresponding at least one of the intensity information, signal strength information, or signal-noise ratio information associated with the second subset; and. the determining the difference comprises determining a difference between a first intensity, a first signal strength or a first signal to noise ratio associated with the first subset of the plurality of radar returns and a second intensity, a second signal strength, or a second signal to noise ratio associated with the second subset of the plurality of radar returns; and the determining the attribute of the road surface comprises determining an icy road condition in response to the difference being below a threshold difference.

P: The method of any one of example F through example O, further comprising: receiving classification information associated with one or more objects in the environment; and determining the first subset of the plurality of returns based at least in part on the classification information.

Q: The method of any one of example F through example P, wherein the determining the attribute is further based, at least in part, on at least one of a range or a height of the first subset of the plurality of points.

R: One or more example non-transitory computer-readable media storing instructions that, when executed, cause one or more processors to perform operations comprising: receiving radar data comprising a plurality of radar returns, individual of the radar returns including height information and additional return information; determining, based at least in part on the height information, a first subset of the plurality of returns comprising one or more direct returns from an object and a second subset of the plurality of returns comprising reflected returns, reflecting off the object and a road surface; and determining, based at least in part on a difference between the first subset of the plurality of returns and the second subset of the plurality of returns, an attribute of the road surface.

S: The one or more non-transitory computer-readable media of example R, wherein: the difference comprises a vertical distance between the first subset of the plurality of returns and the second subset of the plurality of returns; and the attribute of the road surface is a pitch associated with the road surface.

T: The one or more non-transitory computer-readable media of example R or example S, wherein: the difference comprises a difference between a first intensity associated with the first subset of the plurality of returns and a second intensity associated with the second subset of the plurality of returns.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
a radar sensor disposed on the vehicle;
one or more processors; and
one or more non-transitory media storing instructions that, when executed by the one or more processors, perform operations comprising:
receiving, from the radar sensor, radar data containing a plurality of radar returns corresponding to an environment of the vehicle, individual of the plurality of radar returns including height information comprising a vertical distance of the individual of the plurality of radar returns from a horizontal reference, intensity information, and signal strength information;
determining a first subset of the plurality of radar returns comprising one or more direct returns from an object in the environment, the first subset of the plurality of radar returns being associated with a first height;
determining, based at least in part on the height information, a second subset of the plurality of radar returns associated with a second height different from the first height;
determining, based at least in part on the second height, that the second subset of the plurality of radar returns comprise reflected returns reflected off the object and a road surface;
determining a difference between at least one of the intensity information or the signal strength information associated with the first subset and a corresponding at least one of the intensity information or the signal strength information associated with the second subset;
determining, based at least in part on the difference, an attribute of the road surface; and
controlling the vehicle based at least in part on the attribute of the road surface.

2. The vehicle of claim 1, wherein the attribute of the road surface is a road condition comprising at least one of a dry road, a wet road, or an icy road.

3. The vehicle of claim 1, wherein:
the determining the difference comprises determining a difference between a first intensity associated with the first subset of the plurality of radar returns and a second intensity associated with the second subset of the plurality of radar returns; and
the determining the attribute of the road surface comprises determining an icy road condition in response to the difference being below a threshold difference.

4. The vehicle of claim 1, wherein:
the signal strength information includes signal to noise ratio information;
the determining the difference comprises determining a difference between a first signal to noise ratio associated with the first subset of the plurality of radar returns and a second signal to noise ratio associated with the second subset of the plurality of radar returns; and
the determining the attribute of the road surface comprises determining an icy road condition in response to the difference being below a threshold difference.

5. The vehicle of claim 1, wherein the determining the difference comprises:
determining a first average intensity or a first average signal strength associated with the first subset of the plurality of returns;
determining a second average intensity or a second average signal strength associated with the second subset of the plurality of returns; and
determining the difference as a difference between the first average intensity and the second average intensity or as a difference between the first average signal strength or the second average signal.

6. A method comprising:
receiving radar data comprising a plurality of radar returns, individuals of the radar returns including height information comprising a vertical distance of the individual of the plurality of radar returns from a horizontal reference and additional return information;
determining a first subset of the plurality of returns and a second subset of the plurality of returns
determining, based at least in part on the height information, that the first subset of the plurality of returns comprise one or more direct returns from an object and that second subset of the plurality of returns comprise reflected returns, reflecting off the object and a road surface; and determining, based at least in part on a difference between the first subset of the plurality of returns and the second subset of the plurality of returns, an attribute of the road surface.

7. The method of claim 6, wherein:
the difference comprises a vertical distance between the first subset of the plurality of returns and the second subset of the plurality of returns; and
the attribute of the road surface is a pitch associated with the road surface.

8. The method of claim 7, wherein the pitch of the road surface is directly related to the vertical distance.

9. The method of claim 7, wherein the vertical distance is a vertical distance between a first representative point of the first subset of the returns and a second representative point of the second subset of the returns.

10. The method of claim 6, wherein:
the difference comprises a difference between a first intensity associated with the first subset of the plurality of returns and a second intensity associated with the second subset of the plurality of returns.

11. The method of claim 10, wherein the attribute of the road surface is a road condition comprising at least one of a dry road, a wet road, or an icy road.

12. The method of claim 11, wherein the determining the attributes of the road surface comprises determining a wet road or an icy road condition in response to the difference being equal to or below a threshold difference or determining the dry road condition in response to the difference being above the threshold difference.

13. The method of claim 12, further comprising receiving additional information about the environment, wherein the determining the attribute of the road surface is based at least in part on the additional information about the environment.

14. The method of claim 10, wherein the determining the attribute of the road surface comprises comparing the difference to one or more expected differences, the expected differences being associated with one or more road surface types.

15. The method of claim 6, wherein:
the difference is a difference between at least one of intensity information, signal strength information, or signal-noise ratio information associated with the first subset and a corresponding at least one of the intensity information, signal strength information, or signal-noise ratio information associated with the second subset;
the determining the difference comprises determining a difference between a first intensity, a first signal strength or a first signal to noise ratio associated with the first subset of the plurality of radar returns and a second intensity, a second signal strength, or a second signal to noise ratio associated with the second subset of the plurality of radar returns; and
the determining the attribute of the road surface comprises determining an icy road condition in response to the difference being below a threshold difference.

16. The method of claim 6, further comprising:
receiving classification information associated with one or more objects in the environment; and
determining the first subset of the plurality of returns based at least in part on the classification information.

17. The method of claim 6, wherein the determining the attribute is further based, at least in part, on at least one of a range or a height of the first subset of the plurality of points.

18. One or more non-transitory computer-readable media storing instructions that, when executed, cause one or more processors to perform operations comprising:
receiving radar data comprising a plurality of radar returns, individual of the radar returns including height information comprising a vertical distance of the individual of the plurality of radar returns from a horizontal reference and additional return information;
determining a first subset of the plurality of returns and a second subset of the plurality of returns,
determining, based at least in part on the height information, that the first subset of the plurality of returns comprises one or more direct returns from an object and the second subset of the plurality of returns comprising reflected returns, reflecting off the object and a road surface; and
determining, based at least in part on a difference between the first subset of the plurality of returns and the second subset of the plurality of returns, an attribute of the road surface.

19. The one or more non-transitory computer-readable media of claim 18, wherein:
the difference comprises a vertical distance between the first subset of the plurality of returns and the second subset of the plurality of returns; and
the attribute of the road surface is a pitch associated with the road surface.

20. The one or more non-transitory computer-readable media of claim 18, wherein:
the difference comprises a difference between a first intensity associated with the first subset of the plurality of returns and a second intensity associated with the second subset of the plurality of returns.

* * * * *